(12) United States Patent
Sorsby

(10) Patent No.: US 12,449,499 B2
(45) Date of Patent: Oct. 21, 2025

(54) SYSTEM AND METHOD FOR EFFICIENT DIRECTIONAL DISCOVERY OF COMMUNICATIONS TERMINALS VIA BEAM INTERLEAVING

(71) Applicant: Rockwell Collins, Inc., Cedar Rapids, IA (US)

(72) Inventor: William B. Sorsby, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 312 days.

(21) Appl. No.: 18/210,910

(22) Filed: Jun. 16, 2023

(65) Prior Publication Data
US 2024/0418815 A1    Dec. 19, 2024

(51) Int. Cl.
*G01S 3/40* (2006.01)
*G01S 3/04* (2006.01)

(52) U.S. Cl.
CPC .............. *G01S 3/40* (2013.01); *G01S 3/043* (2013.01)

(58) Field of Classification Search
CPC . G01S 3/40; G01S 3/43; G01S 5/0236; G01S 13/46; G01S 2013/468
USPC ... 342/125, 350, 357.44, 367, 372, 451, 458
See application file for complete search history.

(56) References Cited

U.S. PATENT DOCUMENTS

| | | | |
|---|---|---|---|
| 3,996,590 A | 12/1976 | Hammack | |
| 11,047,970 B2 | 6/2021 | Bharadwaj et al. | |
| 11,418,254 B2 | 8/2022 | Buer et al. | |
| 11,516,051 B2 | 11/2022 | Chandrasekhar et al. | |
| 11,525,908 B2 | 12/2022 | Laghezza et al. | |
| 11,611,862 B2 | 3/2023 | Tiirola et al. | |
| 2009/0233545 A1 | 9/2009 | Sutskover et al. | |
| 2015/0054683 A1* | 2/2015 | Hryciuk | G01S 5/0081 342/357.51 |

(Continued)

FOREIGN PATENT DOCUMENTS

| | | |
|---|---|---|
| CN | 115441900 B | 1/2023 |
| EP | 3361647 A1 | 8/2018 |

OTHER PUBLICATIONS

European Search Report received in EP Application No. 24181662.8, Nov. 13, 2024, 21 pages.

(Continued)

*Primary Examiner* — Bo Fan
(74) *Attorney, Agent, or Firm* — Suiter Swantz IP

(57) ABSTRACT

A node of a multi-node network includes a communications interface incorporating one or more paired antenna elements wherein a transmitter (Tx) element and receiver (Rx) element are oriented in opposing directions. The node discovers and/or links to other nodes of the network by orienting each paired antenna element to transmit to other nodes in one direction and receive in the opposing direction (e.g., through a transmit and receive region, the transmit region opposite the receive region). At subsequent time intervals (e.g., alternating with the first time interval or set thereof), the Tx antenna elements transmit in directions through the initial receive region, each transmit direction interleaved between two prior receive directions, while the Rx antenna elements simultaneously attempt to receive in opposing directions through the initial transmit region, each receive direction interleaved between two prior transmit directions.

17 Claims, 9 Drawing Sheets

(56) References Cited

U.S. PATENT DOCUMENTS

| | | | |
|---|---|---|---|
| 2016/0061957 A1* | 3/2016 | Li | H04W 4/02 |
| | | | 342/357.42 |
| 2017/0208373 A1 | 7/2017 | Elder | |
| 2017/0234979 A1* | 8/2017 | Mathews | G01S 1/024 |
| | | | 342/357.64 |
| 2020/0363492 A1 | 11/2020 | Schiffmiller | |
| 2021/0405184 A1 | 12/2021 | Schindler et al. | |
| 2022/0334211 A1 | 10/2022 | Loren et al. | |
| 2022/0386279 A1 | 12/2022 | Tillinger et al. | |
| 2023/0081728 A1 | 3/2023 | Kwon et al. | |
| 2023/0123087 A1* | 4/2023 | Singh | G01S 13/46 |
| | | | 342/385 |

OTHER PUBLICATIONS

Zhensheng Zhang et al: "Neighbor discovery in mobile ad hoc self-configuring networks with directional antennas: algorithms and comparisons", IEEE Transactions on Wireless Communications, IEEE Service Center, Piscataway, NJ, US, vol. 7, No. 5, May 1, 2008 (May 1, 2008), pp. 1540-1549, XP011214998, ISSN: 1536-1276 *Section A Completely Randon Algorithms (CRA) section B Scan-Based Algorithms (SBA) *.

* cited by examiner

810 — For the at least one first time interval, selecting a first orientation parameter from a set of orientation parameters, wherein the at least one first Tx direction and the at least one first Rx direction are based on the first orientation parameter

↓

812 — For the at least one second time interval, selecting a second orientation parameter from the set of orientation parameters excluding the first orientation parameter, wherein the at least one second Tx direction and the at least one second Rx direction are based on the second orientation parameter

*FIG. 8B*

SYSTEM AND METHOD FOR EFFICIENT DIRECTIONAL DISCOVERY OF COMMUNICATIONS TERMINALS VIA BEAM INTERLEAVING

BACKGROUND

A significant issue complicating discovery of directional communications terminals and other member nodes of a multi-node network, e.g., a Mobile Ad hoc communications NETwork (MANET), is that for any given node, the physics and geometry of searching the entire potential physical space to detect transmissions from other nodes within the network tends to be tedious, time-consuming, and generally inefficient. For example, discovery through an entire physical space in minimal time may require a directional communications system to revert to omnidirectional scanning. Omnidirectional discovery, however, clearly negates the gain and privacy benefits associated with directional transmission and/or scanning.

SUMMARY

In a first aspect, a node of a multi-node network (e.g., communications network) is disclosed. In embodiments, the node includes a communications interface incorporating one or more paired directional antenna elements wherein transmitter elements and receiver elements are oriented in opposing directions (e.g., when the transmitter element/s point north, the receiver element/s point south. For example, during a first or "odd" time interval or set of time intervals, transmitter elements transmit in a transmit direction within a designated transmit region with respect to the node, and receiver elements receive (e.g., or attempt to receive) in a receive direction opposing the transmit direction (and within a receive region opposite the transmit region). During a second or subsequent (e.g., "even") time interval, the transmitter elements transmit at transmit directions within the prior interval transmit region, and the receiver elements receive at opposing receiver directions within the prior interval receive region.

In some embodiments, one or more paired directional antenna elements may be steered through a sequence of transmitting directions (and opposing receiving directions), simultaneously transmitting through a transmit region (e.g., an arcuate region surrounding the node) and receiving through a receive region (e.g., an arcuate region opposing the transmit region).

In some embodiments, the transmit and receive regions are semicircular, e.g., such that substantially the entire space surrounding the node falls in either the transmit or the receive region.

In some embodiments, the sets of transmit and receive directions are evenly spaced throughout the transmit and receive regions.

In some embodiments, the node includes multiple paired directional antenna elements capable of transmitting in several desired directions (and receiving in the corresponding opposing directions) at once.

In some embodiments, messages received by the node in a particular receive direction are acknowledgements of, or responses to, prior messages transmitted by the node, e.g., in a transmit direction substantially opposing the receive direction.

In some embodiments, messages transmitted by the node in a particular transmit direction are acknowledgements of, or responses to, prior messages received by the node, e.g., in a receive direction substantially opposing the transmit direction.

In some embodiments, with respect to alternating time intervals or sets thereof (e.g., odd/even), each receive direction is evenly spaced between two adjacent prior transmit directions, and each transmit direction is evenly spaced between two adjacent prior receive directions.

In some embodiments, the sets of transmit and receive directions are substantially planar and relative to a two-dimensional (2D) coordinate system.

In some embodiments, the sets of transmit and receive directions are based on a three-dimensional (3D) coordinate system (e.g., with likely node locations spread throughout 3D space), and each transmit or receive direction includes an elevational component (e.g., each receive direction having an opposing elevational component with respect to its opposing transmit direction).

In some embodiments, transmit and receive regions based on a 3D coordinate system are substantially hemispherical, e.g., semicircular in a reference plane and including an arcuate elevational component.

In some embodiments, transmit and receive directions are based on an orientation parameter selected (e.g., at random) from a set of orientation parameters.

In some embodiments, the controller selects a first orientation parameter for the first (e.g., "odd") interval or set of intervals, and selects a new orientation parameter for the second (e.g., "even") interval or set of intervals from the set of orientation parameters excluding the previously selected first orientation parameter.

In a further aspect, a method for efficient directional discovery between nodes of a multi-node network is also disclosed. In embodiments, the method includes, for at least one first time interval, transmitting messages (e.g., hello messages, node identifier messages) at each of a set of transmit directions via a transmitting (Tx) antenna element of a node of the multi-node network, the set of transmit directions defining a transmit region with respect to the node. For example, the node may include multiple Tx antenna elements, each transmitting in a different transmit direction simultaneously. Alternatively, one or more Tx antenna elements may be steered through a sequence of transmit directions, transmitting at a different direction at each of a set of sub-intervals. The method includes, simultaneous with the transmissions of the first time interval/s, attempting to receive messages from other nodes via receiver (Rx) antenna elements, each Rx antenna element oriented directly opposite a Tx antenna element and thus receiving in a receiver direction simultaneous with a transmission in the corresponding transmit direction. The method includes, for at least one second time interval subsequent to (or alternating with) the first time interval/s, transmitting messages via the Tx antenna elements at transmit directions within the receive region for the first time interval/s, and attempting to receive messages via the Rx antenna elements at receive directions within the transmit region for the first time interval/s, such that each transmit direction for a second time interval is interleaved between two adjacent receive directions for a first time interval (and, similarly, each receive direction for a second interval is interleaved between two adjacent transmit directions for a first interval).

In some embodiments, the method includes simultaneously transmitting, via a set of Tx antenna elements, messages in multiple distinct Tx directions while attempting to receive messages via a set of Rx antenna elements in multiple distinct Rx directions, each Rx direction directly opposing a Tx direction.

In some embodiments, the method includes, for the set of first time intervals, steering one or more Tx antenna elements through a sequence of transmit directions defining the transmit region while also attempting to receive via the Rx antenna elements oriented in the opposite direction (and defining the receive region).

In some embodiments, the method further includes selecting, for the first time interval/s, a first orientation parameter (e.g., selecting randomly from a set of possible orientation parameters) such that the Tx directions (and opposing Rx directions) for the first time intervals are based on the first orientation parameter. The method includes selecting, for the second time interval/s, a second orientation parameter from the set of possible orientation parameters (excluding any previously selected parameter/s) such that the set of Tx directions for the second time interval/s (e.g., within the receive region for the first time interval/s) are based on the selected second orientation parameter.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 5 is a tabular representation of orientation directions and scanning patterns of the node of FIG. 1 according to example embodiments of this disclosure;

and FIGS. 8A and 8B are process flow diagrams illustrating a method for directional discovery within a multi-node network according to example embodiments of this disclosure.

DETAILED DESCRIPTION

Figure 1:
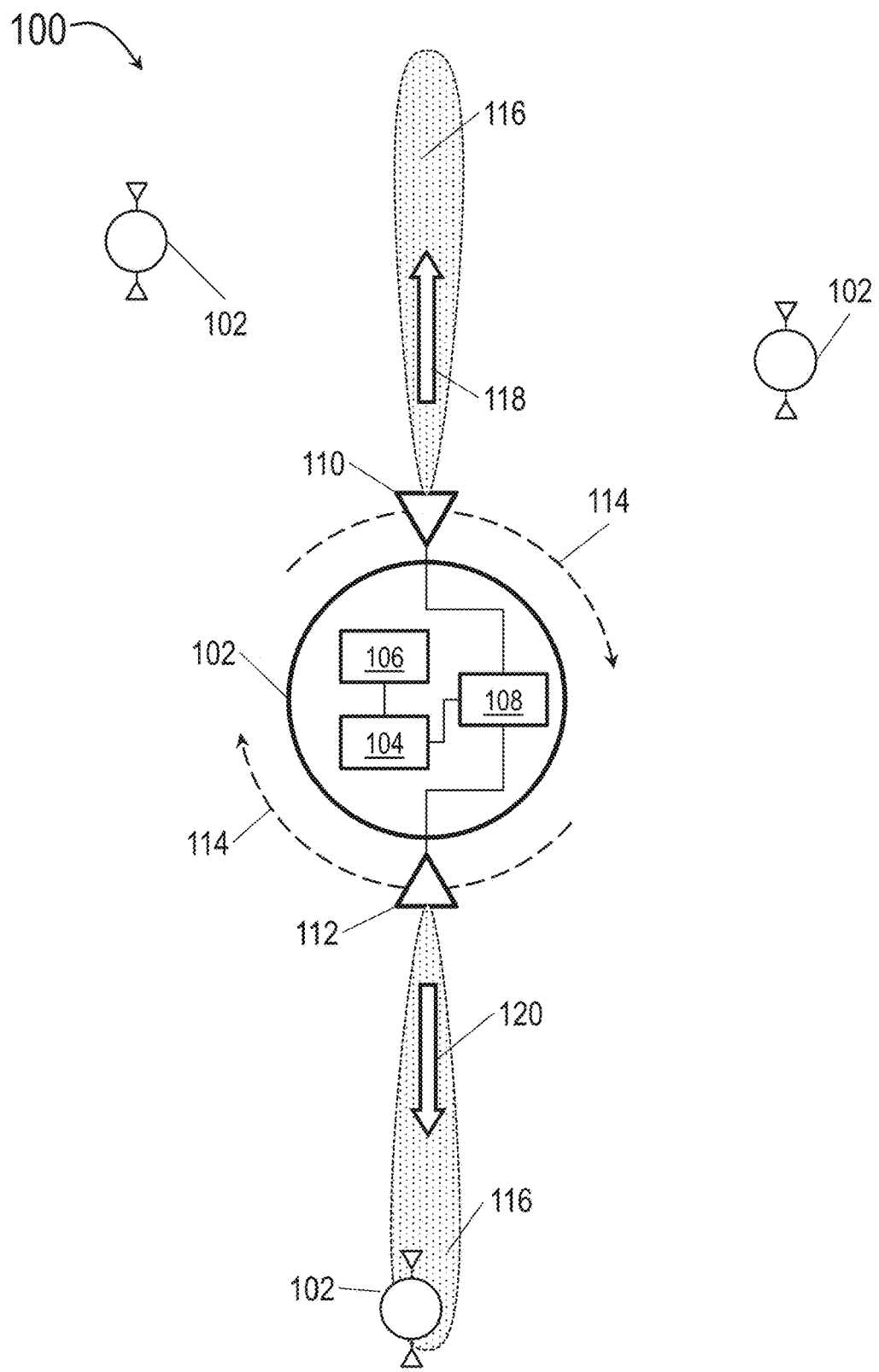
FIG. 1 is a block diagram illustrating a node of a multi-node network according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to nodes and multi-node networks configured for optimally efficient node discovery via synchronized interleaved scanning. For example, a subtle drawback of conventional synchronized scanning protocols is associated with double transmission of data via the same link. Given two terminals or nodes A and B, a link between nodes A and B may be established whether A first receives B's transmission or B receives A's transmission, which suggests (and provides the opportunity to eliminate) unnecessarily duplicative scanning. Accordingly, synchronized scanning protocols may effectively double beam coverage via simultaneous transmission and reception in opposite directions. Per the example above, only one transmission between nodes A and B is necessary to establish a link; according to embodiments of the inventive concepts disclosed herein, only one such transmission (rather than two) takes place. Either A transmits in B's direction, and B receives, or B transmits in A's direction, and A receives.

Referring to FIG. 1, a multi-node network 100 is disclosed. The multi-node network 100 may include multiple nodes 102.

In embodiments, the multi-node network 100 may include any multi-node communications network known in the art. For example, the multi-node network 100 may include a mobile ad-hoc network (MANET) in which each node 102 is able to move freely and independently. Similarly, the nodes 102 may include any communications node known in the art which may be communicatively coupled. In this regard, the nodes 102 may include any communications node known in the art for transmitting/transceiving data packets. For example, the nodes 102, may include, but are not limited to, radios (such as on a vehicle or on a person), mobile phones, smart phones, tablets, smart watches, laptops, and the like. In embodiments, each node 102 of the multi-node network 100 may each include, but are not limited to, a respective controller 104 (e.g., control processor), memory 106, communication interface 108, and antenna elements 110, 112.

In embodiments, the controller 104 provides processing functionality for at least the node 102 and can include any number of processors, micro-controllers, circuitry, field programmable gate array (FPGA) or other processing systems, and resident or external memory for storing data, executable code, and other information accessed or generated by the node 102. The controller 104 can execute one or more software programs embodied in a non-transitory computer readable medium (e.g., memory 106) that implement techniques described herein. The controller 104 is not limited by the materials from which it is formed or the processing mechanisms employed therein and, as such, can be implemented via semiconductor(s) and/or transistors (e.g., using electronic integrated circuit (IC) components), and so forth.

In embodiments, the memory 106 can be an example of tangible, computer-readable storage medium that provides storage functionality to store various data and/or program code associated with operation of the node 102 and/or controller 104, such as software programs and/or code segments, or other data to instruct the controller, and possibly other components of the node 102, to perform the functionality described herein. Thus, the memory 106 can store data, such as a program of instructions for operating the node 102, including its components (e.g., controller 104, communication interface 108, antenna elements 110, 112, etc.), and so forth. It should be noted that while a single memory 106 is described, a wide variety of types and combinations of memory (e.g., tangible, non-transitory memory) can be employed. The memory 106 can be integral with the controller 104, can comprise stand-alone memory, or can be a combination of both. Some examples of the memory 106 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

In embodiments, the communication interface 108 can be configured to retrieve data from the controller 104 or other devices, transmit data for storage in the memory 106, retrieve data from storage in the memory, and so forth. The communication interface 108 can also be communicatively coupled with the controller 104 to facilitate data transfer between components of the node 102 and the controller 104. It should be noted that while the communication interface 110 is described as a component of the node 102, one or more components of the communication interface 110 can be implemented as external components communicatively coupled to the node 102 via a wired and/or wireless connection. The node 102 can also include and/or connect to one or more input/output (I/O) devices. In embodiments, the communication interface 108 includes or is coupled to a transmitter, receiver, transceiver, physical connection interface, or any combination thereof.

It is contemplated herein that the communication interface 108 of the node 102 may be configured to communicatively couple to additional communication interfaces of additional communications nodes of the multi-node network 100 using any wireless communication techniques known in the art including, but not limited to, Direct Sequence Spread Spectrum (DSSS), GSM, GPRS, CDMA, EV-DO, EDGE, WiMAX, 3G, 4G, 4G LTE, 5G, WiFi protocols, RF, LoRa, and the like.

In embodiments, the antenna elements 110, 112 may comprise paired directional antenna elements capable of being steered or otherwise directed (e.g., via the communications interface 108) for coordinated spatial scanning in a full 360-degree arc (114) relative to the node 102 (or even less than a full 360-degree arc). For example, the antenna element 110 may be configured for transmission, reception, and/or scanning through a coverage area 116 (e.g., which may be defined by a directional beam width) in a first direction 118 (e.g., N degrees relative to due north or some other reference direction). Similarly, the antenna element 112 may be configured for transmission, reception, and/or scanning through a coverage area 116 in a second direction 120 directly opposite the first direction 118 (e.g., N+180 degrees relative to due north or some other reference direction). In some embodiments, the paired antenna elements 110, 112 may be configured for coordinated steering, such that both antenna elements (and their respective coverage areas 116) may be uniformly steered or directed to any pair of opposing angles and/or directions 118, 120. In some embodiments, one antenna element 110 may be configured exclusively for transmission while the other antenna element 112 is configured exclusively for reception. In other embodiments, both antenna elements 110, 112 may be configured for transmission or reception as needed.

Figure 2B:
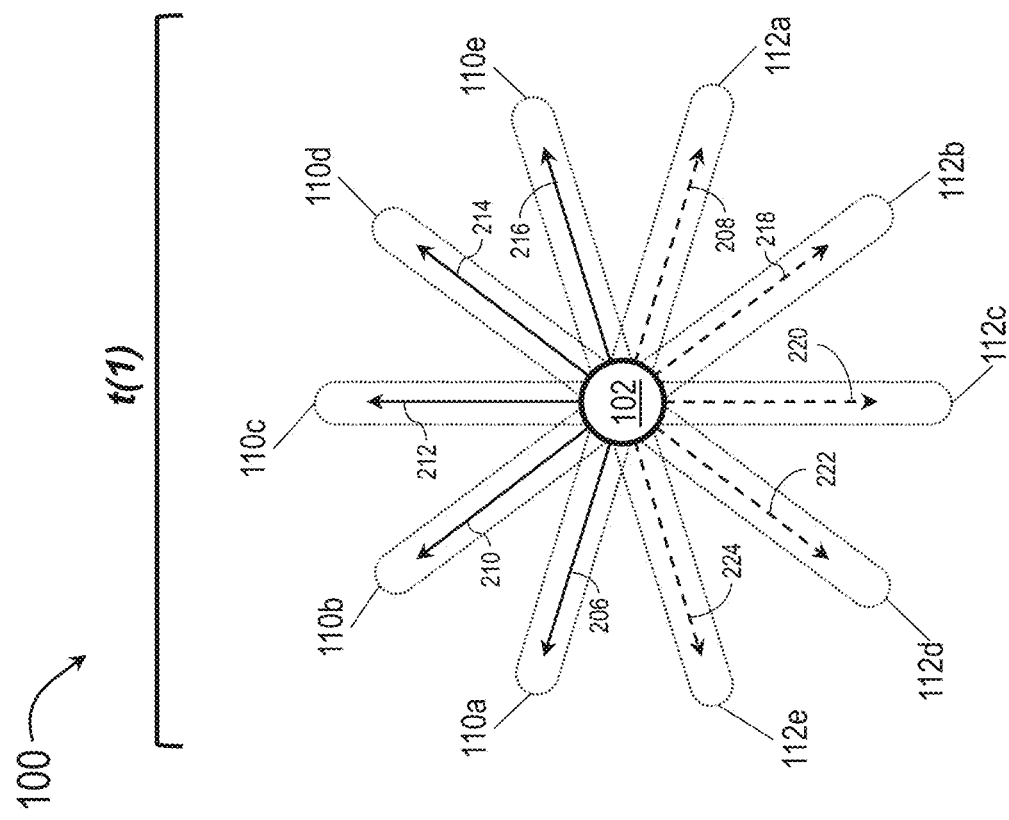
FIG. 2B is a block diagram illustrating an alternative implementation of interleaved synchronized scanning by the node of FIG. 1 through the first scanning region.
Figure 2A:
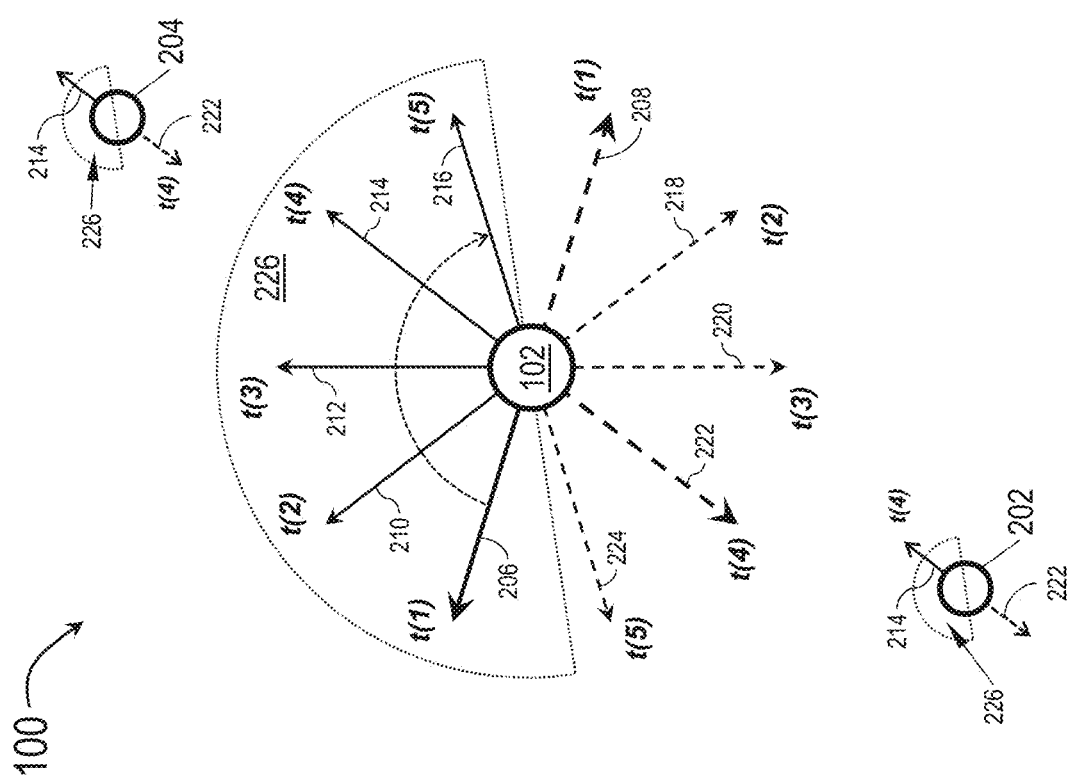
FIG. 2A is a block diagram illustrating interleaved synchronized scanning by the node of FIG. 1 through a first scanning region according to example embodiments of this disclosure.
Figure 3:
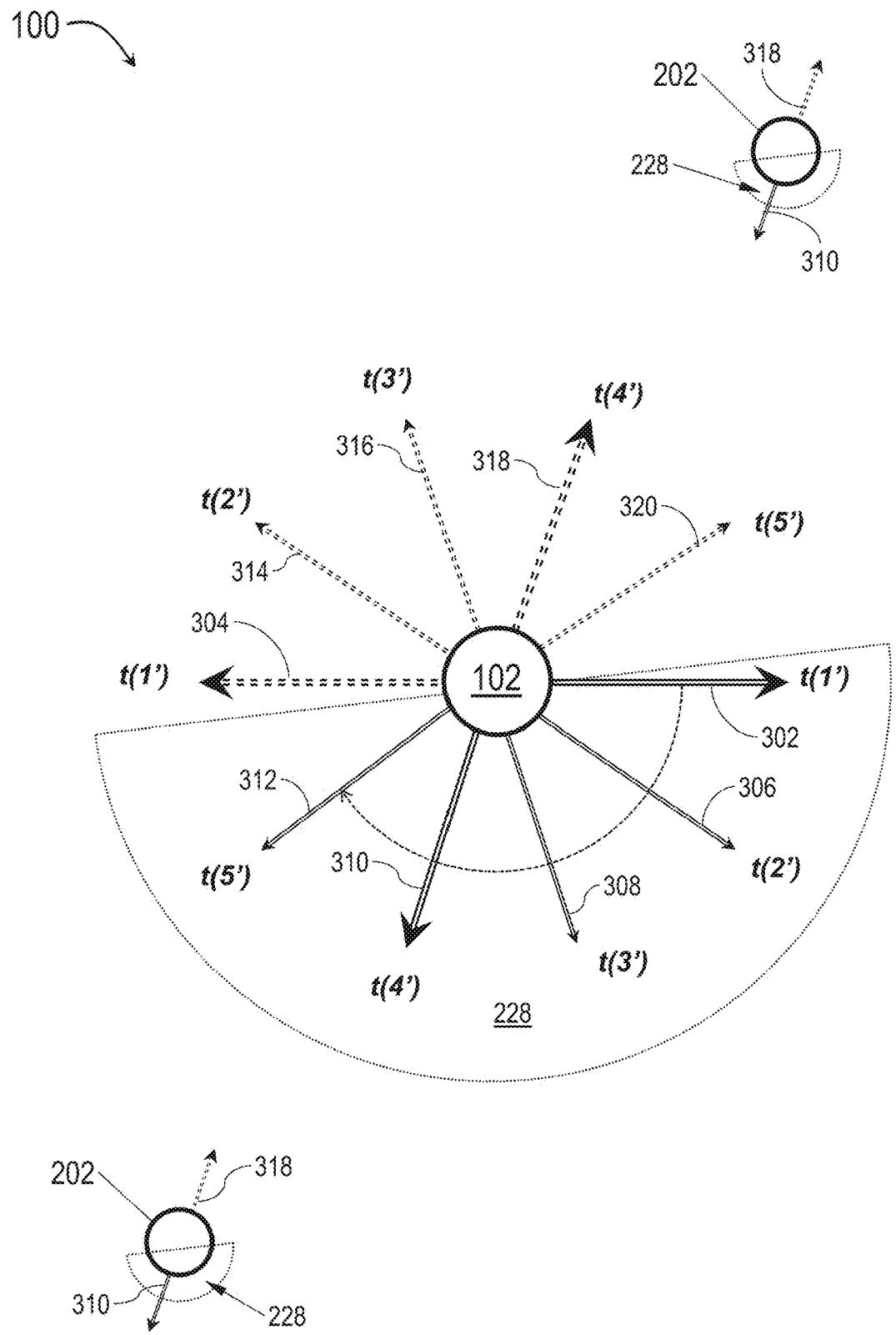
FIG. 3 is a block diagram illustrating interleaved synchronized scanning by the node of FIG. 1 through a second scanning region according to example embodiments of this disclosure.

Referring now to FIGS. 2A and 3, the multi-node network 100 is shown. In the interest of simplicity, the multi-node network 100 and its component nodes 102, 202, 204 may be disposed substantially within a two-dimensional (2D) plane wherein each node may discover and link to neighbor nodes within a 360-degree space. As disclosed in greater detail below, the multi-node network 100 may likewise be distributed in a three-dimensional (3D) space, e.g., relative to a reference plane.

In embodiments, the node 102, as well as like neighbor nodes 202, 204 of the multi-node network 100, may quickly and efficiently discover each other (e.g., and establish directional communications links among each other) via interleaved synchronized scanning. For example, at a coordinated time interval t (n) the paired antenna elements (110, 112; FIG. 1) of the node 102, as well as the paired antenna elements of the nodes 202, 204, may simultaneously transmit at a common transmit (Tx) direction 206 and receive (e.g., scan, detect transmissions from other nodes) at a common receiving (Rx) direction 208 opposite the Tx direction. In some embodiments, each node 102, 202, 204 may transmit a hello message, or a data packet uniquely identifying the transmitting node; in some embodiments, transmissions may additionally include position information of the transmitting node, neighbor lists, and/or other information useful for node discovery and/or link establishment. In some embodiments, one or more nodes 102, 202, 204 may be in motion relative to each other, e.g., one node may be in motion relative to a stationary node or two nodes may both be in motion along non-parallel vectors. It may be noted that "receive" as used above and with respect to embodiments of the inventive concepts disclosed herein refers to an attempt to receive signals or messages from other nodes via the antenna elements 112, whether or not there is an actual message or signal to be received (e.g., whether or not the attempt is successful). For example, there may at some time intervals be no nodes currently or recently transmitting toward the nodes 102, 202, 204, or no transmitting nodes within range of the antenna elements 112.

In embodiments, each node 102, 202, 204 may continue to perform synchronized transmissions in Tx directions 210, 212, 214, 216 each synchronized transmission simultaneous with a synchronized reception scan in an opposing Rx direction 218, 220, 222, 224. For example, the set of Tx directions 206, 210-216 may define a transmission (Tx) region 226, within which the Tx directions are evenly spaced to provide optimal coverage of the Tx region. Similarly, the set of Rx directions 208, 218-224 may define a reception (Rx) region 228, such that the Tx and Rx regions divide the space relative to each node 102, 202, 204 into mutually exclusive sub-regions. For example, the Tx and Rx regions 226, 228, respectively, may be substantially semicircular, such that relative to any node 102 another node 202, 204 may be found either in its Tx region or in its Rx region. In some embodiments, the Tx and Rx regions 226, 228 relative to a node 102 (or relative to all nodes 102, 202, 204) may be defined by smaller arcuate regions, e.g., based on the topology of the multi-node network 100 and/or the likely positions of its component nodes.

In embodiments, each synchronized transmission/reception scan by the node 102 may occur at a discrete coordinated time interval, e.g., as part of a sequence t(n1), t(n2), . . . t(n). In other embodiments, referring in particular to FIG. 2B, the entire search space may be covered during a single time interval (e.g., t(1)) by using multiple beams and multiple sets of paired antenna elements 110a-110e, 112a-112e, each paired antenna element simultaneously transmitting in a different Tx direction 206, 210, 212, 214, 216 and receiving in an opposing Rx direction 208, 218, 220, 222, 224. For example, with respect to simultaneous-beam implementations, a Tx region 226 (FIG. 2A) may correspond to or include every Tx direction 206, 210-216 at which the paired antenna elements 110a-110e simultaneously transmit during the time interval t(1).

Figure 6:
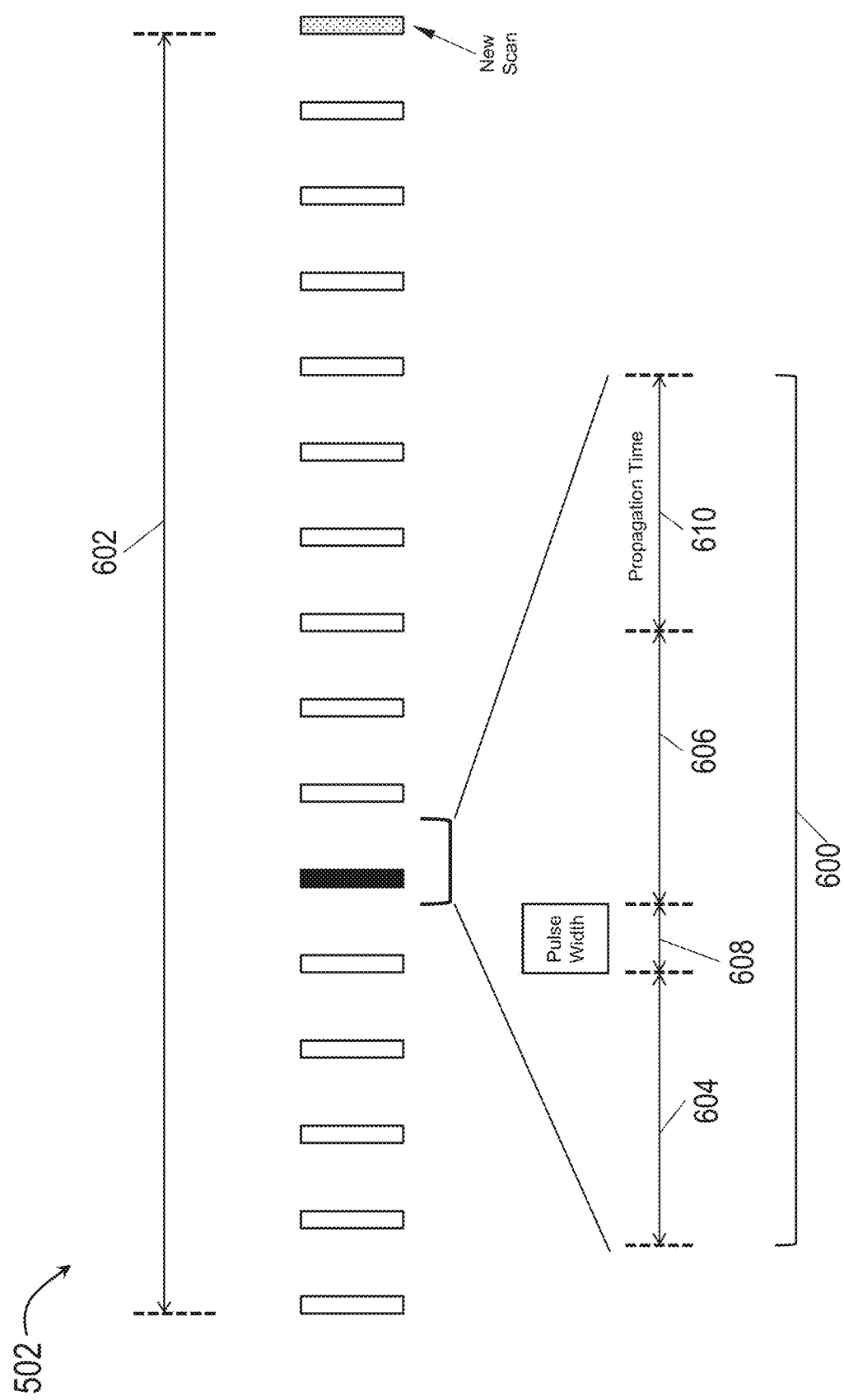
FIG. 6 is a diagrammatic illustration of a scanning timeline for the node of FIG. 1 according to example embodiments of this disclosure.

In embodiments, simultaneous transmissions and reception scans by each node 102, 202, 204 may result in some nodes receiving or detecting transmissions from other nodes. For example, when all nodes 102, 202, and 204 are transmitting in the Tx direction 214, each node is likewise receiving in the Rx direction 222. Accordingly, during this time interval the node 204 may detect and/or receive transmissions by the node 102; likewise, the node 102 may detect and/or receive transmissions by the node 204. In embodiments, simultaneous signal transmissions may occupy a small portion of the coordinated time interval. For example, and as shown in FIG. 6 below, various propagation delays may then spread the arrival times of the transmitted signals at receiving nodes across the entirety of the coordinated time interval.

Referring in particular to FIG. 3, at one or more subsequent time intervals t(p') (e.g., subsequent to, and/or alternating with, the time interval/s t(p) shown by FIG. 2A), the nodes 102, 202, and 204 may perform synchronized transmissions through the Rx region 228 and receptions through the Tx region 226. For example, at a first time interval t(1'), the nodes 102, 202, 204 may perform a synchronized transmission in the Tx direction 302 and reception in the Rx direction 304, continuing at subsequent time intervals t(2') . . . t(p') to transmit in Rx directions 306, 308, 310, 312 while receiving in Tx directions 314, 316, 318, 320. In embodiments, while the nodes 102, 202, 204 are transmitting through the Rx region 228, each node may acknowledge or respond to previously detected or received messages and/or establish communications links among each other. For example, while transmitting in the Tx direction 310 and receiving in the Tx direction 318, the node 204 may acknowledge or respond to the message received (as shown by FIG. 2A) from the node 102 (and, e.g., establish a link between the nodes 102, 204); similarly, the node 102 may acknowledge or respond to the transmission received from the node 202.

In embodiments, each node 102, 202, 204 may follow a set of transmissions through the Tx region 226 (and corresponding receptions through the Rx region 228) with a set of transmissions through the Rx region and receptions through the Tx region. Alternatively or additionally, each node 102, 202, 204 may alternate transmissions through the Tx region 226 and receptions through the Rx region 228 (e.g., transmitting in the Tx direction 206/receiving in the Rx direction 208) with transmissions through the Rx region 228/receptions through the Tx region 226 (e.g., transmitting in the Rx direction 302/receiving in the Tx direction 304). In some embodiments, the node 102 may incorporate multiple paired antenna elements (110a-110e, 112a-112e; FIG. 2B) configured for simultaneous transmission in the Tx directions 302, 306-312 (and corresponding reception at the Rx directions 304, 314-320) at a single time interval as shown above by FIG. 2B.

In embodiments, the Tx directions 206, 210-216 and Rx directions 304, 314-320 may be evenly spaced throughout the Tx region 226, and the Rx directions 208, 218-224 and Tx directions 302, 306-312 may be evenly spaced throughout the Rx region 228. For example, in simultaneously transmitting through a Tx region 226 and receiving through an Rx region 228, the nodes 102, 202, 204 may select 4, 5, 8, 12, or any number of evenly spaced directions in order to efficiently sweep the whole (e.g., 360 degrees) of the Tx and Rx regions 226, 228 in as few transmit dwells as possible. It may be noted that, with respect to FIGS. 2A and 3, the nodes 102, 202, 204 of the multi-node network 100 may mutually discover and link to any nodes within a 360-degree radius based on two sets of five transmissions (e.g., transmitting through the Tx region/receiving through the Rx region 228 as shown by FIG. 2A, then receiving through the Rx region/transmitting through the Rx region as shown by FIG. 3), using only half as many transmit beams (and, e.g., half as many transmit dwells) compared to transmitting, and then receiving, in all ten Tx directions 206, 210-216, 302, 306-312 and all ten Rx directions 208, 218-224, 304, 314-320.

Figure 4:
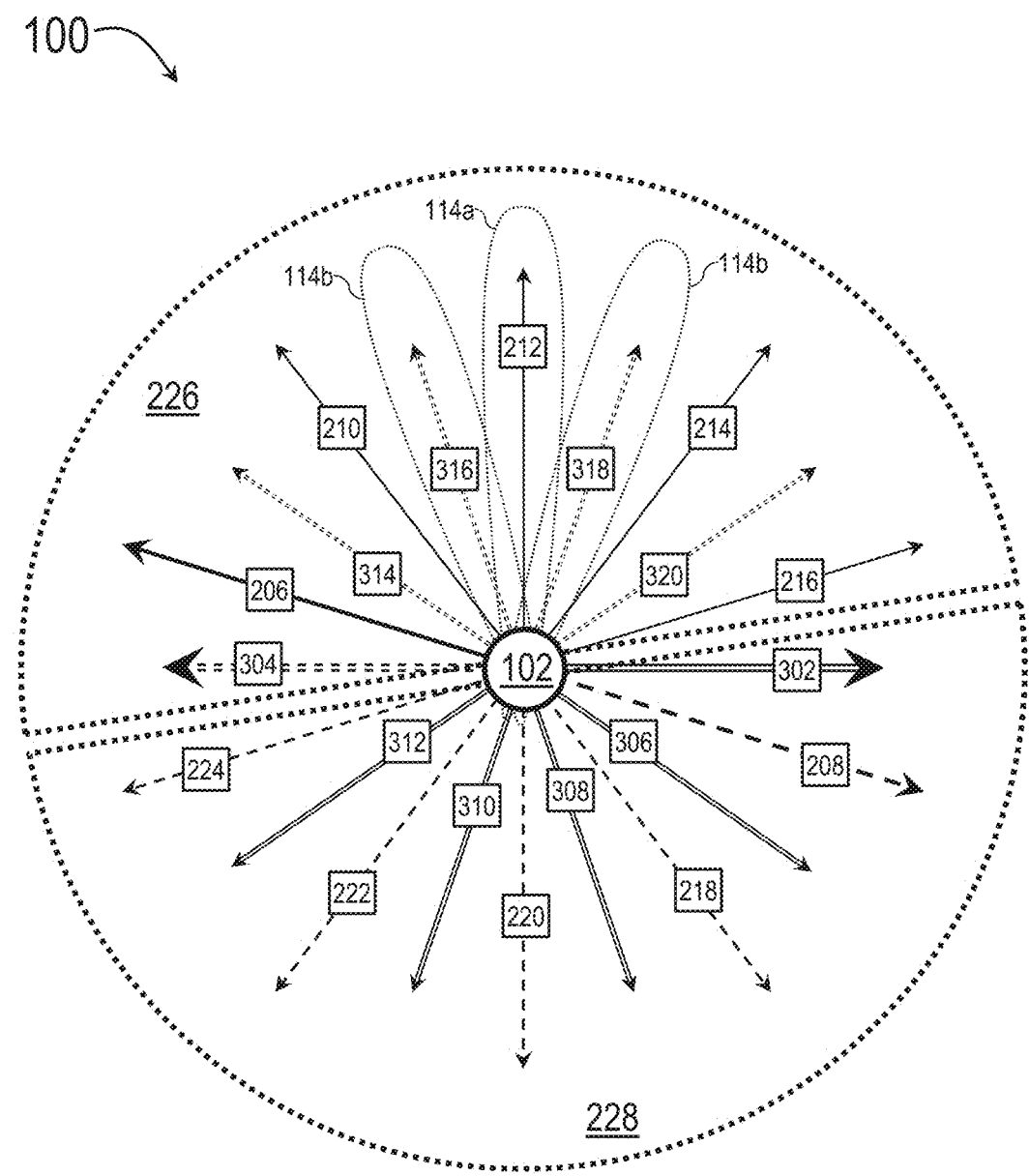
FIG. 4 is a block diagram illustrating composite coverage by the interleaved synchronized scanning of FIGS. 2A through 3.

Referring now to FIG. 4, the multi-node network 100 of FIGS. 2A through 3 is shown.

In embodiments, the multi-node network 100 (and in particular the node 102 thereof) may further optimize discovery through the full 360-degree space surrounding the node by interleaving transmit and reception beams. For example, and as also shown by FIG. 2A, with respect to the Tx region 226 it may be noted that each of the Tx directions 206, 210, 212, 214, 216 (and, e.g., their corresponding coverage areas/beams 114*a*) bisects two adjacent Rx directions 304, 314, 316, 318, 320 (and, e.g., corresponding coverage areas/beams 114*b*). The same is true with respect to each Rx direction 304, 314-320 bisecting two adjacent Tx directions 206, 210-216. Similarly, with respect to the Rx region 228, it may be noted that the set of Rx directions 208, 218-224 (as also shown by FIG. 2) and the set of Tx directions 302, 306-312) may likewise be mutually interleaved. By interleaving transmit and receive directions as shown by FIGS. 2A through 3, the nodes 102, 202, 204 may optimize node discovery through a full 360-degree space even with smaller numbers of transmit and receive beams (e.g., 8-beam or even 4-beam as opposed to 16-beam or even 32-beam). Similarly, with larger numbers of transmit and receive beams, greater precision may be achieved by adding more pointing directions. In either case, interleaving transmit and receive directions may improve efficiency whether the set of discovery directions (Tx/Rx) are searched simultaneously, e.g., with multiple beams transmitting and receiving at once, or sequentially, e.g., by traversing the Tx and Rx regions 226, 228 with a single set of transmit/receive beams until the full search area has been covered.

Figure 5:
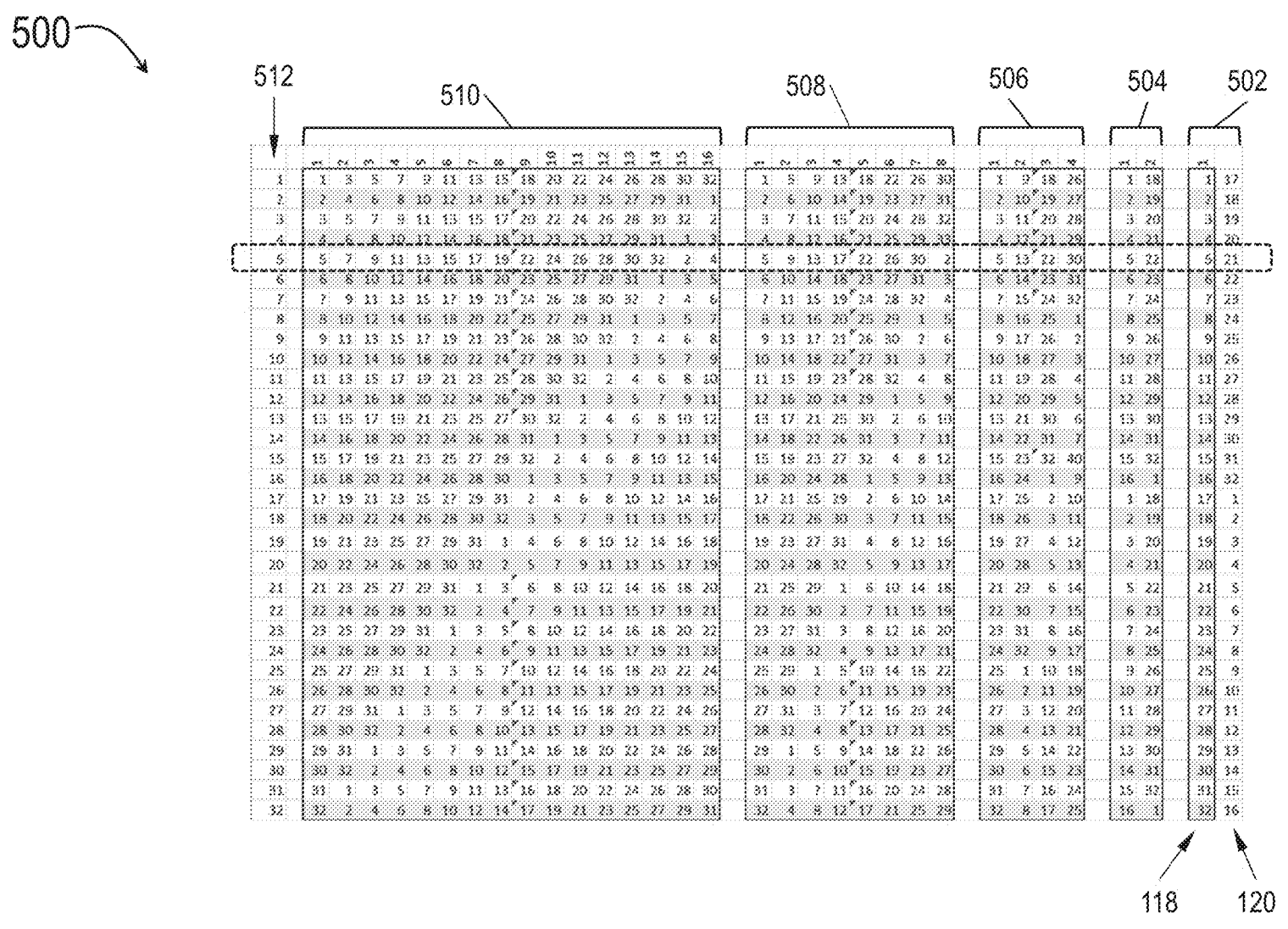

Referring now to FIG. 5, the multi-node network 100 and its component nodes 102, 202, 204 (FIGS. 1 through 4) may optimize node discovery within a 360-degree space by directing the transmit and receive beams of their antenna elements (110, 112; FIG. 1) according to a randomly selected orientation direction.

In embodiments, the multi-node network 100 and component nodes 102, 202, 204 may perform node discovery via a set of simultaneous transmit/receive beams (e.g., as shown by FIG. 2A, a simultaneous transmission in a Tx direction 206 and reception in an opposing Rx direction 208). For example, as shown by the table 500, the set may include one simultaneous Tx/Rx beam (502), two simultaneous beams (504), 4 simultaneous beams (506), 8 simultaneous beams (508), 16 simultaneous beams (510), or any other desired or available number of simultaneous Tx/Rx beams. With respect to the single-beam system 502, both transmission (Tx direction 206, FIG. 2A) and reception (Rx direction 208, FIG. 2A) are shown; with respect to multiple-beams systems 504 through 510, Tx directions only are indicated, with the corresponding Rx direction for each Tx direction being 180 degrees in opposition.

In embodiments, Tx and Rx directions incorporated by the multi-node network 100 may be determined by an orientation parameter 512 selected at random (e.g., by a node controller (102, FIG. 1) or other controller of the multi-node network. For example, the granularity of the orientation parameter 512 (e.g., orientation number) may be determined by the desired level of precision; for example, dividing the 360-degree space into 32 compass points as shown by FIG. 5 results in a granularity of 11.25 degrees per point. Accordingly, if the orientation number 32 is assigned to due north (0 degrees), orientation number 1 may indicate 11.25 degrees east of due north. Similarly, orientation number 8 may indicate 90 degrees, or due east; orientation number 16 may indicate 180 degrees, or due south; orientation number 24 may indicate 270 degrees, or due west; and orientation number 32 may likewise indicate 360 degrees (=0 degrees, or due north again).

In embodiments, given 32 possible pointing directions as shown by FIG. 5 and a one, two, 4, 8, or 16-beam system, selection of an orientation parameter 512 may determine which Tx and Rx directions are used for simultaneous beam pointing for a particular discovery interval. For example, if the orientation number 5 is selected, the single-beam system 502 or node may point the antenna element 110 (e.g., for transmission) to a bearing direction of 56.25 degrees (e.g., 5*11.25) and the antenna element 112 (e.g., for reception) to the opposing direction (e.g., 21*11.25, or 236.25 degrees).

Similarly, the two-beam system 504 (orientation number 5→5, 22) may incorporate the single-beam directions above (e.g., 5/21=) 56.25°/236.25° plus a rotation of 11.25 degrees (e.g., in addition to a 180-degree rotation from the single beam position), thus 22*11.25=247.5° (and a corresponding receive direction of) 67.5°.

In embodiments, the 4-beam system 506 (orientation number 5→5, 13, 22, 30) would incorporate two beam directions common with the two-beam system (5/21 and 22/6, as described above) in addition to 13 (146.25°/213.75°, or 13/19) and 30 (337.5°/22.5°, or 30/2), which bisect the directions used by the two-beam system. Similarly, the 8-beam system 508 (orientation number 5→5, 9, 13, 17, 22, 26, 30, 2) incorporates directions 5, 13, 22, and 30 in common with the 4-beam system 506 (and bisects those directions via additional directions 9, 17, 26, 2), and the 16-beam system 510 (orientation number 5→5, 7, 9, 11, 13, 15, 17, 19, 22, 24, 26, 28, 30, 32, 2, 4) incorporates directions 5, 9, 13, 17, 22, 26, 30, 2 in common with the 8-beam system and bisects those directions via additional directions 7, 11, 15, 19, 24, 28, 32, 4.

In embodiments, where a first discovery time interval (e.g., search interval) incorporates one, two, 4, 8, 16 or some other number of simultaneous Tx/Rx beams as described above, any subsequent discovery time interval may select a new orientation parameter 512 without replacement of the prior selected parameter/s (e.g., excluding any previously selected parameter from the set or pool of available parameters). For example, fastest overall discovery may be achieved via random selection without replacement, but selection with replacement may be used if the additional search time is acceptable to system requirements.

Referring also to FIG. 6, a scanning timeline for the single-beam system 502 is shown. In embodiments, while the 16-beam system (510, FIG. 5) may scan the full 360-degree space within a single discovery time interval or transmit dwell (e.g., via simultaneous transmission in 16 directions and simultaneous reception in 16 opposing directions), the single-beam system 502 may select an orientation parameter (512, FIG. 5) and cycle through each of a set of associated Tx/Rx directions (e.g., orientation number 5→5, 7, 9, 11, 13, 15, 17, 19, 22, 24, 26, 28, 30, 32, 2, 4) for each of 16 discovery time intervals 600 comprising a scanning period 602 (corresponding to a full 360-degree waterline scan). For example, each discovery time interval 600 may include a period of time uncertainty 604, 606 both before and after the actual transmitted pulse 608 (e.g., for repositioning of the antenna elements (110, 112; FIG. 2) as well as a propagation time 610.

Figure 7:
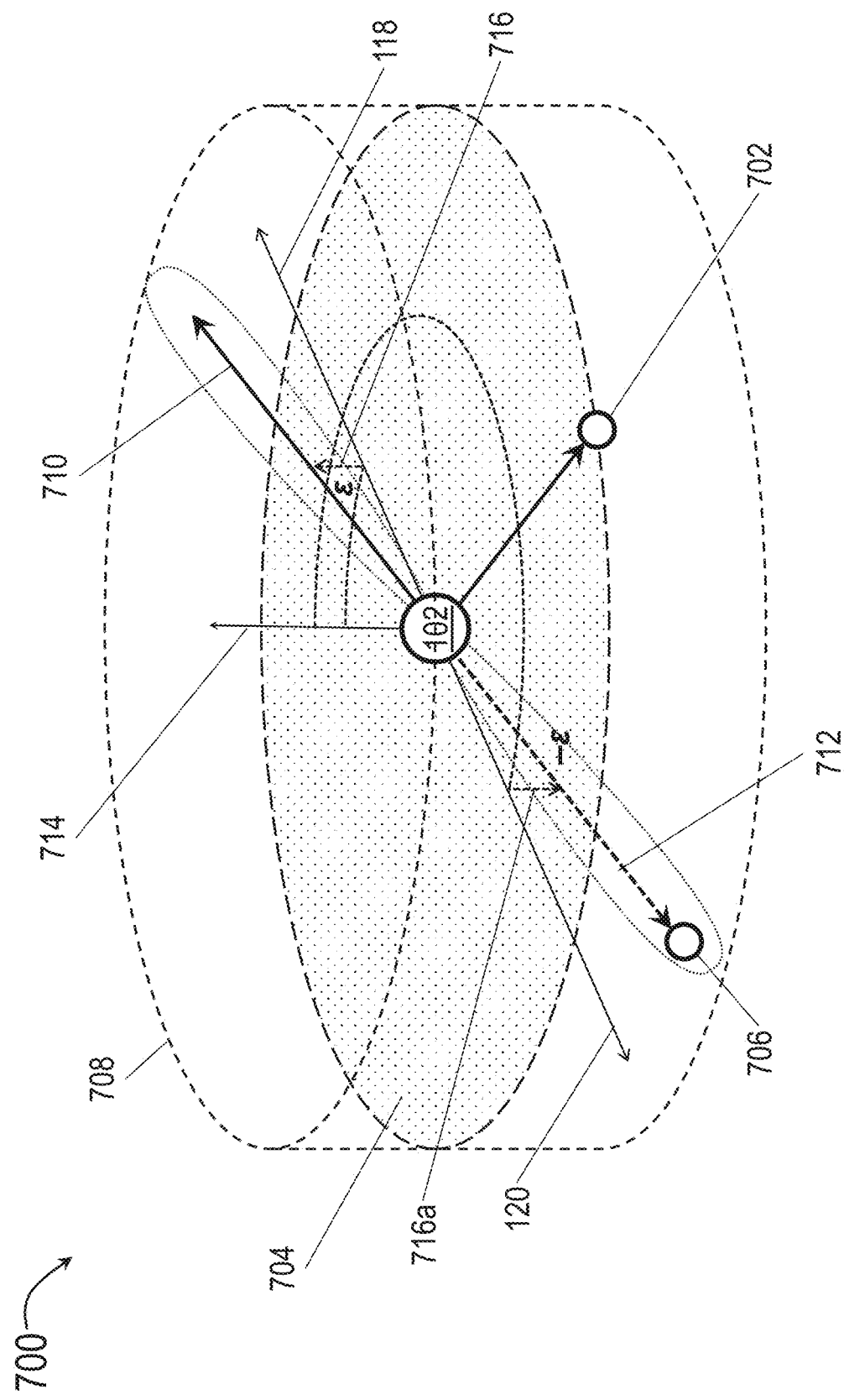
FIG. 7 is a diagrammatic illustration of the node of FIG. 1 configured for coordinated discovery through a three-dimensional (3D) space according to example embodiments of this disclosure.

Referring to FIG. 7, the multi-node network 700 may be implemented and may function similarly to the multi-node network 100 of FIGS. 1 through 6, except that the multi-node network 700 may include, in addition to component nodes 102, 702 substantially in a common two-dimensional reference plane 704 (e.g., horizon) additional nodes 706 disposed in a three-dimensional space and not in the reference plane 704. Accordingly, the multi-node network 700 may incorporate node discovery through a three-dimensional (3D) space 708. For example, the 3D space 708 may be spherical (e.g., relative to the node 102) or include a predetermined amount of z-axis elevation relative to the reference plane 704. For example, the nodes 102, 702, 706 may perform simultaneous transmissions 710 and receptions 712 in opposing directions 118, 120 (e.g., relative to due north or some other reference direction 714) but also incorporating an elevational angle & relative to the reference plane 704. Accordingly, each transmission 710 by the nodes 102, 702, 706 may involve pointing the corresponding antenna element (110, FIG. 1) to a particular Tx direction 118 and elevational angle ε (716) above the reference plane 704, such that the antenna element (112, FIG. 1) for reception 712 points to the opposing direction 120 and elevational angle −ε (716a) below the reference plane.

Figure 8A:
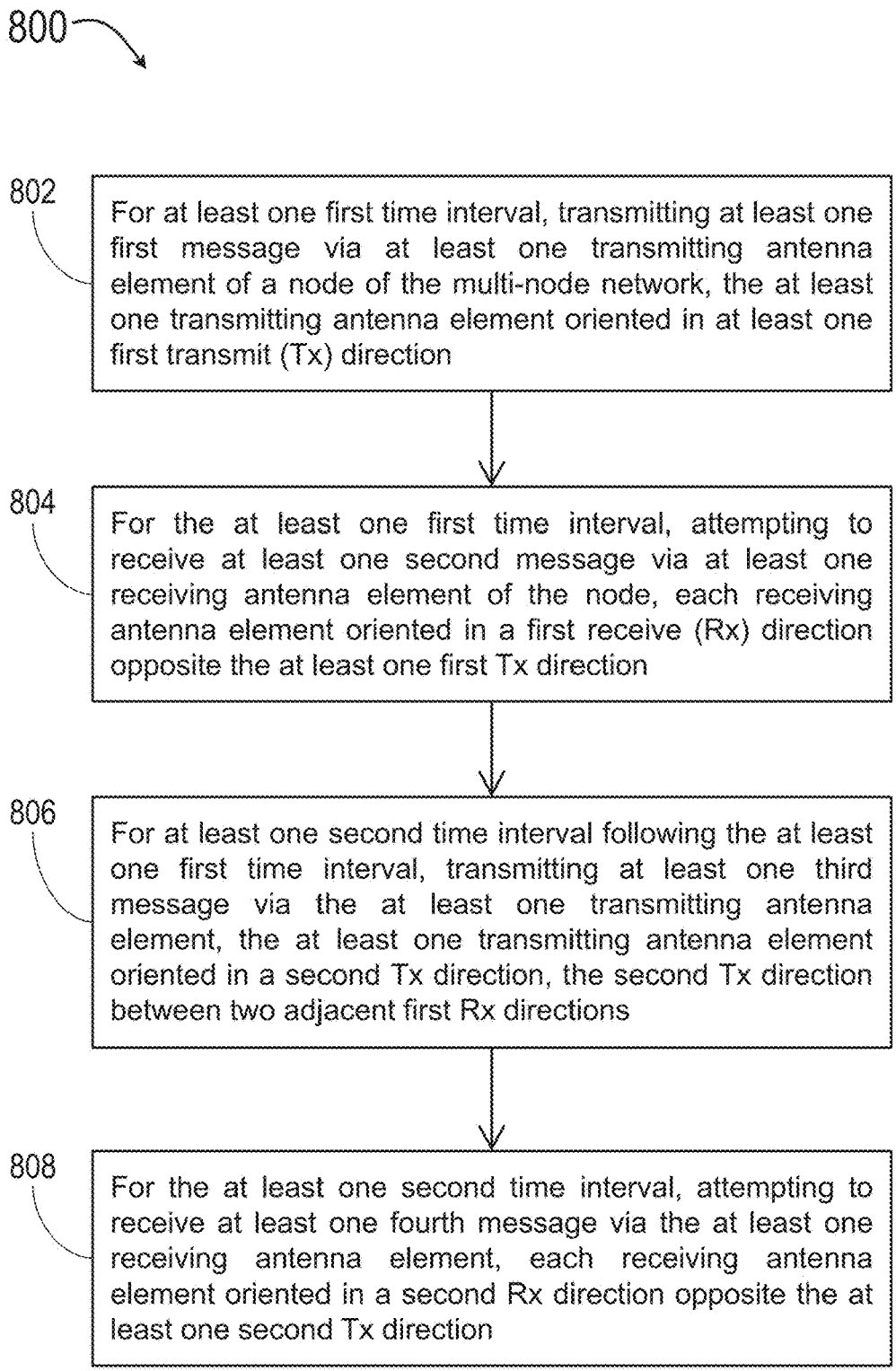

Referring now to FIG. 8A, the method 800 may be implemented by nodes of the multi-node network 100 and may include the following steps.

At a step 802, at a first time interval (e.g., or set of first time intervals) the node transmits an outbound message (e.g., hello message, node identifier message) via a transmitting antenna element oriented in a transmit (Tx) direction. In some embodiments, the node may include multiple transmitting antenna elements, each transmitting at a different Tx direction. For example, the set of different Tx directions may be evenly spaced and may define a transmit (Tx) region, e.g., a semicircle (for two-dimensional networks), a hemisphere (for three-dimensional networks), or other arcuate/conical region. In other embodiments, one or more transmitting antenna elements may be steered through a sequence of Tx directions (e.g., also defining a Tx region), transmitting at each Tx direction before being steered to the next Tx direction in the sequence.

At a step 804, simultaneous with the transmissions of outbound messages in step 802, the node receives inbound messages (e.g., acknowledgements of, or responses to, prior transmissions in the opposing Tx direction) via receiving antenna elements, each receiving antenna element oriented opposite a corresponding transmitting antenna element (e.g., in a Rx direction opposite the Tx direction). For example, as each transmitting antenna element transmits in a Tx direction, the corresponding receiving antenna element receives in the opposing Rx direction.

At a step 806, at a subsequent time interval (e.g., or set of time intervals subsequent to the first time interval/s), each transmitting antenna element transmits outbound messages in a new Tx direction interleaved between two adjacent prior Rx directions (e.g., Rx directions to which the receiving antenna elements are oriented during a first or previous time interval).

At a step 808, simultaneous with the transmissions of step 806, each receiving antenna element receives inbound messages in a new Rx direction opposite the new Tx direction.

Referring also to FIG. 8B, the method 800 may include additional steps 810 and 812. At the step 810, the node controller selects an orientation parameter from a set of orientation parameters, such that the Tx directions (and opposing Rx directions) for the first time interval/s are based on the selected orientation parameter, e.g., the set of directions for simultaneous transmissions/receptions by multiple Tx/Rx antenna units or the initial direction for sequential transmissions/receptions by a single Tx/Rx antenna unit.

At the step 812, the node controller selects a new orientation parameter for each second or subsequent time interval or set of intervals, excluding previously selected orientation parameters from the set. Accordingly, the set of Tx/Rx directions for the second or subsequent time interval are based on the newly selected orientation parameter.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

I claim:

1. A node of a multi-node network, the node comprising:
   a communications interface including at least one paired directional antenna element comprising 1) a transmit (Tx) antenna element steerable to a first direction and 2) a receive (Rx) antenna element oriented opposite the first direction;
   and
   a controller operatively coupled to the communications interface, the controller including one or more processors and configured to, for one or more first time intervals:
   transmit, via the at least one Tx antenna element, at least one message in a transmit (Tx) direction within a transmit (Tx) region;
   and
   receive, via the at least one Rx antenna element pointed in the Rx direction, at least one message transmitted by a neighbor node of the network, the Rx direction within a receive (Rx) region;
   the controller configured to, for one or more second time intervals subsequent to the first time intervals:
   transmit, via the at least one Tx antenna element, at least one message in a Tx direction within the Rx region;
   and
   receive, via the at least one Rx antenna element, at least one message in a Rx direction within the Tx region.

2. The node of claim 1, wherein:
   the controller is configured to, for each of a sequence of first time intervals, steer the at least one paired directional antenna elements to each of a sequence of Tx directions, the sequence of Tx directions defining the Tx region;

the at least one Tx antenna element is configured to transmit the at least one message at each of the sequence of Tx directions;

the at least one Rx antenna element is configured to receive the at least one message at each of a sequence of Rx directions directly opposite the sequence of Tx directions, the sequence of Rx directions defining the Rx region.

3. The node of claim 2, wherein at least one of the Tx region or the Rx region corresponds to a semicircular arc.

4. The node of claim 2, wherein:
the set of one or more Tx directions corresponding to the one or more first time intervals are evenly spaced apart within the Tx region;
and
the set of one or more Rx directions corresponding to the one or more first time intervals are evenly spaced apart within the Rx region.

5. The node of claim 1, wherein the communications interface comprises at least two paired directional antenna elements, each paired directional antenna element configured to, at each first time interval:
transmit in a Tx direction distinct from the Tx direction of each other paired directional antenna element;
and
receive in an Rx direction opposite the Tx direction.

6. The node of claim 1, wherein at least one message received at a second time interval is at least one of an acknowledgement of, or a response to, a message transmitted at a first time interval by the controller at a Tx direction opposite the Rx direction associated with the received message.

7. The node of claim 1, wherein at least one message transmitted at a second time interval is at least one of an acknowledgement of, or a response to, a message received at a first time interval by the controller at an Rx direction opposite the Tx direction associated with the transmitted message.

8. The node of claim 1, wherein:
each Rx direction corresponding to a second time interval is evenly spaced between two adjacent Tx directions corresponding to a first time interval;
and
each Tx direction corresponding to a second time interval is evenly spaced between two adjacent Rx directions corresponding to a first time interval.

9. The node of claim 1, wherein the set of one or more Tx directions and the set of one or more Rx directions are relative to a two-dimensional (2D) coordinate system.

10. The node of claim 1, wherein;
the set of one or more Tx directions and the set of one or more Rx directions are relative to a three-dimensional (3D) coordinate system;
and
each Tx direction and each Rx direction includes an elevational component.

11. The node of claim 10, wherein at least one of the Tx region or the Rx region corresponds to a hemisphere.

12. The node of claim 1, wherein:
each Tx direction and opposing Rx direction corresponding to the one or more first time intervals are based on an orientation parameter;
and
the controller is configured to randomly select the orientation parameter from a set of orientation parameters.

13. The node of claim 12, wherein the orientation parameter is a first orientation parameter, and the controller is configured to, for the one or more second time intervals, select a second orientation parameter from the set of orientation parameters excluding the first orientation parameter, and
wherein each Tx direction and opposing Rx direction corresponding to the one or more second time intervals is based on the selected second orientation parameter.

14. A method for directional discovery of nodes within a multi-node network, the method comprising:
for at least one first time interval, transmitting at least one first message via at least one transmitting antenna element of a node of the multi-node network, the at least one transmitting antenna element oriented in at least one first transmit (Tx) direction;
for the at least one first time interval, attempting to receive at least one second message via at least one receiving antenna element of the node, each receiving antenna element oriented in a first receive (Rx) direction opposite the at least one first Tx direction;
for at least one second time interval following the at least one first time interval, transmitting at least one third message via the at least one transmitting antenna element, the at least one transmitting antenna element oriented in a second Tx direction, the second Tx direction between two adjacent first Rx directions;
and
for the at least one second time interval, attempting to receive at least one fourth message via the at least one receiving antenna element, each receiving antenna element oriented in a second Rx direction opposite the at least one second Tx direction.

15. The method of claim 14, wherein:
for at least one first time interval, transmitting at least one first message via at least one transmitting antenna element of a node of the multi-node network includes:
simultaneously transmitting the at least one first message via a plurality of transmitting antenna elements, each transmitting antenna element oriented in a distinct first Tx direction;
and wherein
for the at least one first time interval, attempting to receive at least one second message via at least one receiving antenna element of the node includes:
simultaneously attempting to receive the at least one second message via a plurality of receiving antenna elements, each transmitting antenna element oriented in a distinct first Rx direction opposite the corresponding distinct first Tx direction.

16. The method of claim 14, wherein:
for at least one first time interval, transmitting at least one first message via at least one transmitting antenna element of a node of the multi-node network includes, for each of a plurality of sub-intervals within the first time interval and a sequence of first Tx directions defining a Tx region:
transmitting the at least one first message at a first Tx direction while attempting to receive the at least one second message at a first Rx direction opposite the first Tx direction;
orienting the transmitting and receiving antenna element to a subsequent first Tx direction of the sequence;
and
until the sequence of first Tx directions is exhausted, transmitting the at least one first message at each subsequent first Tx direction while attempting to receive the at least one second message at a subsequent first Rx direction opposite each subsequent first Tx direction.

17. The method of claim 14, further comprising:

for the at least one first time interval, selecting a first orientation parameter from a set of orientation parameters, wherein the at least one first Tx direction and the at least one first Rx direction are based on the first orientation parameter; and for the at least one second time interval, selecting a second orientation parameter from the set of orientation parameters excluding the first orientation parameter, wherein the at least one second Tx direction and the at least one second Rx direction are based on the second orientation parameter.

\* \* \* \* \*